United States Patent [19]

Young

[11] 4,344,927

[45] Aug. 17, 1982

[54] METHOD OF PREPARING CRYSTALLINE SILICA POLYMORPH

[76] Inventor: Dean A. Young, 4721 Palm Ave., Yorba Linda, Calif. 92686

[21] Appl. No.: 217,238

[22] Filed: Dec. 17, 1980

Related U.S. Application Data

[63] Continuation-in-part of Ser. No. 12,867, Feb. 16, 1979, abandoned.

[51] Int. Cl.$^3$ .............................................. C01B 33/12
[52] U.S. Cl. ................... 423/339; 252/449; 423/335
[58] Field of Search ................. 423/335, 338, 339; 252/449, 451

[56] References Cited

U.S. PATENT DOCUMENTS

| | | | |
|---|---|---|---|
| 3,884,835 | 5/1975 | Vaughan | 423/338 X |
| 4,002,698 | 1/1977 | Kaeding . | |
| 4,025,572 | 5/1977 | Lago . | |
| 4,061,724 | 12/1977 | Grose | 423/335 |

*Primary Examiner*—Jack Cooper

[57] ABSTRACT

A crystalline silicate suitable for use in preparing an aromatic alkylation or isomerization catalyst is prepared by hydrothermally crystallizing said crystalline silicate from a silicate solution containing an organic agent, in combination with a base solution, and an acid solution. Crystallization is effected utilizing high shear mixing.

7 Claims, No Drawings

METHOD OF PREPARING CRYSTALLINE SILICA POLYMORPH

RELATED APPLICATIONS

This application is a continuation-in-part of application Ser. No. 12,867, filed Feb. 16, 1979 now abandoned.

BACKGROUND OF THE INVENTION

The present invention resides in a crystalline silicate and a process for preparing the same.

The preparation of catalysts suitable for use in isomerization reactions and the synthesis of alkylated aromatic hydrocarbons by reacting toluene with a methylating agent is not a new concept. Catalysts and processes are available for producing various mixtures of hydrocarbons, such as, xylene isomers, polyalkylbenzenes, etc. Catalysts and methods of preparing the same, which have been used in the past to prepare xylenes, benzenes, etc. are those selected from acidic cogels, acid-promoted kieselguhr, and various crystalline zeolite aluminosilicates.

Crystalline zeolites are described as a three-dimensional network of structural units consisting of silicon-centered $SiO_4$ and aluminum centered $AlO_4$ of a tetrahedral configuration, the tetrahedra being interconnected by a mutual sharing of oxygen atoms, the structural arrangement of which forms cavities or cells forming crystalline channels or pore openings having a uniform diameter characteristic of each variety or type of crystalline zeolite.

The crystalline silicate herein, which is a major component in aromatic alkylating or isomerization catalysts, has a topological type of crystalline structure composed of silicate tetrahedra connected in a framework to form a three-dimensional system of intersecting channels defined by 10-ring members sufficiently wide enough to absorb molecules up to 6 Å in diameter. The crystalline silicate is hydrophobic and organophilic, and selectively adsorbs organic molecules over water.

The crystalline silicate herein is particularly suited for admixing with inorganic refractory oxides and promoters, such as, phosphorus and nitrogen compounds and the like, to prepare a catalyst useful in alkylation and isomerization reactions.

The preparation and use of silica in a catalyst which is suitable for use in aromatic alkylation and isomerization reactions is appreciated and disclosed by the prior art.

For example, U.S. Pat. No. 4,061,724 relates to a crystalline silica composition which is described as selective in adsorbing organic materials from water in either the liquid or vapor phase. The crystalline silica is described as suitable for removing organic compounds from waste water.

U.S. Pat. No. 4,002,698 teaches a process for methylating toluene to selectively produce paraxylene by contacting toluene with a methylating agent under methylation conditions in the presence of a crystalline aluminosilicate zeolite catalyst.

Another process for alkylating aromatic hydrocarbons is set forth in U.S. Pat. No. 4,025,572; particularly, the reference discloses a process for the conversion of alcohols or ethers to olefinic and aromatic hydrocarbons in the presence of a crystalline aluminosilicate zeolite. This process is described as suitable for simultaneously producing olefinic hydrocarbons and mononuclear aromatics with high selectively for para-xylene formation.

U.S. Pat. No. 3,884,835 relates to crystalline silica compositions which are synthesized from a sodium silicate or other silica source having a sodium oxide to silica oxide ration of 0.3 to 7. The chemical composition is essentially 100 percent silica with less than about 3 percent aluminum oxide and sodium oxide.

As can readily be determined from the above, there is an ongoing research effort for new and better catalysts, including crystalline silicates, for use in alkylation and isomerization reactions.

SUMMARY OF THE INVENTION

The present invention resides in a crystalline silicate, said crystalline silicate having as the four strongest d-values of its X-ray diffraction pattern, $d=11.05$, $d=9.96$, $d=3.82$ and $d=3.34$, and having the X-Ray diffraction pattern set forth in Table 1, after calcination at 1,000° F. for 16 hours.

Preparation of the silica polymorph comprises hydrothermally crystallizing a crystalline silica by (1) subjecting an aqueous reaction to high shear mixing for 4 to 100 hours, under reaction conditions, said aqueous reaction mixture containing from 2 to 6 weight percent, preferably from 3 to 5 weight percent of sodium oxide, from 8 to 16 weight percent, especially from 10 to 13 weight percent of silicon oxide, from 0.01 to 0.25 weight percent, preferably from 0.02 to 0.20 weight percent of disodium 4-dodecylated oxydibenzene sulfonate, from 2 to 5 weight percent, especially from 3 to 4 weight percent of anhydrous sulfuric acid, from 0.5 to 3 weight percent of sodium chloride and either from 6 to 15 weight percent, preferably from 6 to 13 weight percent of tetrapropyl ammonium bromide or a mixture which comprises from 2 to 4 weight percent, especially from 2 to 3 weight percent of tripropylamine, from 1 to 3 weight percent, preferably from 2 to 3 weight percent of 1-bromopropane and from 3 to 6 weight percent, preferably from 3 to 5 weight percent of methylethyl ketone, and (2) crystallizing said silica polymorph during said high shear mixing.

DETAILED DESCRIPTION OF THE INVENTION

This invention resides in a crystalline silicate and a method of preparing the same. The crystalline silicate herein may conveniently be used as a catalytic component in a catalyst suitable for use in an aromatic alkylation or isomerization reaction. One process for alkylating aromatics, including catalysts containing silica polymorphs, is disclosed in U.S. Pat. No. 4,270,017 entitled "Process for Selectively Producing Para-Xylene", the disclosure of which is incorporated herein by reference.

In a preferred mode, the crystalline silicate herein is prepared by the hydrothermal crystallization, under reaction, conditions of a reaction mixture comprising an aqueous-silicate solution, an aqueous-acid solution, an organic agent, and an aqueous-base solution wherein said mixture is subjected to high shear mixing, during the crystallization period.

The reaction herein is preferably conducted under increased temperature and pressure, in addition, high shear mixing during the crystallization period is used. Normally, temperatures used herein, preferably are from about 250° F. to about 380° F., especially from about 250° F. to 340° F.

Generally, the reaction herein may be conducted at atmospheric pressure. However, to insure complete interaction of the reactants and to maintain the reaction mixture in liquid phase, a pressure of from about 15 p.s.i.g. to about 300 p.s.i.g., preferably from about 15 p.s.i.g. to about 200 p.s.i.g. is used.

High shear mixing or agitation of the reaction mixture herein may be performed using standard techniques and apparatus, for example, a pressure vessel equipped with mixing or agitation means. High shear mixing or agitation is defined herein as shaking, rocking, stirring, etc.

Normally, high shear mixing as defined herein comprises agitation which is equivalent to a mixing blade peripheral speed of from about 360 to about 900 ft/minute, preferably from about 360 to 700 ft/minute and a mixture velocity gradient or shearing stress of from about 7,000 to about 18,000 ft/minute/ft, especially from about 7,000 to about 14,000 ft/minute/ft.

Generally, the reaction mixture as further described hereinafter is subjected to high shear mixing or agitation for from about 4 to about 100 hours, especially from about 4 to about 70 hours during the crystallization period.

In a preferred mode, the crystalline silicate herein is prepared by the hydrothermal crystallization of a reaction mixture comprising an aqueous-silicate solution, an aqueous-acid solution, an organic agent and an aqueous-base solution. A rather unique crystalline structure is obtained by crystallizing said silicate compound during high shear mixing of the mixture.

The reaction mixture comprises: (A) from 50 to 75 weight percent, especially from 55 to 70 weight percent of an aqueous-silicate solution which comprises sodium silicate from 4 to 10 weight percent, preferably from 4.5 to 7.0 weight percent as sodium oxide and from 10 to 25 weight percent, especially from 14 to 22 weight percent as silica oxide, and, from 0.01 to 0.25, preferably from 0.02 to 0.20 weight percent of disodium 4-dodecylated oxydibenzene sulfonate, (B) from 20 to 35 weight percent, especially from 24 to 30 weight percent of an aqueous-acid solution which comprises from 5 to 20 weight percent, preferably from 10 to 15 weight percent of sulfuric acid, and from 20 to 15 weight percent, especially from 3 to 10 weight percent of sodium chloride, (C) from 5 to 15 weight percent, preferably from 7 to 11 weight percent of an organic agent which comprises either tetrapropyl ammonium bromide or a mixture comprising from 20 to 35 weight percent, especially from 26 to 32 weight percent of tripropylamine, from 20 to 30 weight percent, preferably from 22 to 26 weight percent of 1-bromopropane and from 40 to 55 weight percent, especially from about 42 to 52 weight percent of methylethyl ketone, (D) from 0 to 2.0 weight percent, preferably from about 0.01 to 1.00 weight percent of an aqueous-base solution which comprises from 10 to 30 weight percent, especially from 10 to 25 weight percent of sodium hydroxide as sodium oxide.

The aqueous reaction mixture thus formed contains the following components on a weight basis.

From 2 to 6 weight percent, preferably from 3 to 5 weight percent of sodium oxide, from 8 to 16 weight percent, especially from 10 to 13 weight percent of silicon oxide, from 0.01 to 0.25 weight percent, preferably from 0.02 to 0.20 weight percent of disodium 4-dodecylated oxydibenzene sulfonate, from 2 to 5 weight percent, especially from 3 to 4 weight percent of sulfuric acid, from 0.5 to 3 weight percent of sodium chloride and either from 6 to 15 weight percent, preferably from 6 to 13 weight percent of tetrapropyl ammonium bromide or a mixture which comprises from 2 to 4 weight percent, especially from 2 to 3 weight percent of tripropylamine, from 1 to 3 weight percent, preferably from 2 to 3 weight percent of 1-bromopropane and from 3 to 6 weight percent, preferably from 3 to 5 weight percent of methylethyl ketone, and the balance being water.

The crystalline silicate produced from the above-described mixture, has a topologic type of tetrahedral framework, which contains a large fraction of five-membered rings of silica-oxygen tetrahedra. The framework comprises a three-dimensional system of intersecting channels which are defined as ten rings of oxygen atoms extending in three directions. Precursor-organic nitrogen ions which occupy the intersecting channels, are removed by heating or extracting with an acid to yield the desired silica polymorph. The resulting void volume occupies approximately 33% of the crystal structure, and the three-dimensional channel is wide enough to absorb organic molecules having up to about 6 Å in diameter. The silica polymorph, herein, degrades to glass products and dense crystalline silica above about 2,732° F.

The crystalline silicate produced in this invention in analogous to highly siliceous alkali silicates which form as insoluble compounds during extended hydrothermal digestion. The organic agent in the form of a nitrogen compound incorporated as a cation during crystallization of the crystalline silicate herein, becomes a source of micropores when eliminated by combustion or extraction. The surface of these micropores are relatively free of hydroxyl groups. The isolated hydroxyl groups which are present provide a moderate acidic strength when the crystalline is thermally activated. The crystalline silicate may be modified and bonded into catalytic aggregates by admixing with refractory oxides and promoters.

The above compound is a uniquely stable, active solid which is suitable for use as a catalyst component or in catalysts used in hydrocarbon reactions, such as cracking, isomerization, polymerization, reforming and alkylation.

The crystalline silicate disclosed and claimed herein is designated as USC-3 and has the following X-ray diffraction pattern after calcination at 1,000° F. for 16 hours.

TABLE 1

| Interplanar Spacing d(°A) | Relative Intensity $I/I_o$ |
|---|---|
| 11.05 | 66 |
| 9.96 | 44 |
| 6.68 | 7 |
| 6.37 | 9 |
| 6.01 | 12 |
| 5.70 | 7 |
| 5.59 | 8 |
| 4.35 | 5 |
| 4.25 | 27 |
| 4.04 | 7 |
| 3.82 | 46 |
| 3.80 | 26 |
| 3.71 | 22 |
| 3.65 | 9 |
| 3.63 | 9 |
| 3.39 | 33 |
| 3.34 | 100 |
| 2.98 | 9 |
| 2.46 | 7 |
| 2.28 | 5 |

TABLE 1-continued

| Interplanar Spacing d(°A) | Relative Intensity I/I$_o$ |
|---|---|
| 2.24 | 4 |

These values were determined using standard techniques and apparatus. A Geiger Counter Spectrometer with a strip chart pen recorder was used and the radiation source was the K-alpha doublet of copper. The peak heights designated as I, and the peak position designated as a function of two times theta, where theta is the Bragg angle, were read from the spectomer chart. The relative intensities, 100 I/I$_o$, wherein I$_o$ is the intensity of the strongest line or peak and d (obs), the interplanar spacing in A, corresponding to the recorded lines.

DESCRIPTION OF PREFERRED EMBODIMENTS

The following Examples serve to further illustrate and instruct one skilled in the art the best mode of how to practice this invention and are not intended to be construed as limiting thereof.

EXAMPLE I

A crystalline silicate suitable for use in preparing an aromatic alkylating or isomerization catalyst is prepared from the following solutions:
1. Base solution, 6N NaOH
2. Silicate solution composed of: 2870 grams of commercial sodium silicate containing 8.9% Na$_2$O and 28.7% SiO$_2$, 1670 ml of water and 9 gm of Dow-Fax 2Al wetting agent$^{(A)}$ (A) Dow-Tax 2Al-45%, solution of disodium 4-dodecylated oxydibenzene-sulfonate.

3. Acid solution composed of: 147 ml of 36N H$_2$SO$_4$, 1730 ml of water, and 130 gm of NaCl
4. Organic agent composed of: 207 gm of tripropylamine, 172 gm of 1-bromopropane, and 329 gm of methylethyl ketone A hydrogel is formed by combining 900 ml of the above described acid solution with 1900 ml of the silicate solution through a mixing tee. Next, 15 ml of 6 N sodium hydroxide are mixed with the hydrogel. A 343 gm portion of the organic solution is mixed into the hydrogel. The mixture is allowed to gel and a 3400 ml portion of the hydrogel mixture is transferred to a heated, autoclave pressurized with 100 psig of nitrogen and equipped with two revolving paddles having a diameter of 3.5 inches. The autoclave has a 4.75 inch diameter with breaker strips attached to the inner side and has a capacity of 3.785 liters. The paddles are rotated at 600 RPM, a peripheral-blade speed of 550 ft/minute and a mixture velocity gradient of 10,500 ft/minute/ft.

The digestion conditions and reaction product characteristics are disclosed in Table 2 below.

TABLE 2

| Crystalline Silicate | UCS-3$^{(B)}$ |
|---|---|
| Digestion Conditions | |
| Temperature, °F. | 330 |
| Total Hours at Temp. | 60 |
| Stirrer Speed, RPM | 600 |
| Hours Stirred | 60 |
| Product Qualities | |
| Nitrogen Content, wt. % N$^{(C)}$ | 0.26 |
| Sodium Content, wt. % Na$_2$O$^{(D)}$ | 1.72 |

TABLE 2-continued

| Surface area M$^2$/g$^{(D)}$ | 176 |
|---|---|

$^{(B)}$UCS-3 — Name given to the crystalline silicate herein.
$^{(C)}$The samples were dried at 230° F. prior to determining the nitrogen content.
$^{(D)}$The samples were calcined at 800° F. prior to determining the sodium content and surface area. The surface area was calculated from nitrogen adsorption at 0.02 relative pressure.

The X-ray powder diffraction pattern of the above crystalline silicate has as its strongest lines (i.e., interplanar spacing) those disclosed in Table 3 below.

TABLE 3

| d-°A | Relative Intensity 100 I/I$_o$ |
|---|---|
| 11.05 | 66 |
| 9.96 | 44 |
| 3.82 | 46 |
| 3.34 | 100 |

EXAMPLE II

A representative alkylating catalyst is prepared by digesting the crystalline silicate (UCS-3) produced in Example I, in an acidic 10% solution of ammonium nitrte for about 30 minutes using 5 ml of solution per gram of silica polymorph. The solids are collected by filtration, washed, and the digestion process is repeated for a total of two ion exchanges. The exchanged crystalline silicate (100 grams) is then mulled with 51 grams of "Capapal S", a pure boehmite alumina powder. Sufficient ¼ normal nitric acid is added to peptize the alumina powder, forming a paste like mixture with the crystalline silicate (UCS-3). The paste is spread in a thin layer, dried, granulated to 10/30 mesh, and calcined 2 hours at 1000° F.

The calcined granules are immersed in 3.75 M phosphoric acid for 30 minutes, drained, dried at 230° F. (108.9° C.), and calcined 2 hours at 900° F. (482° C.). The resultant catalyst is particularly suitable for use as an aromatic alkylation or isomerization catalyst.

Obviously, many modifications and variations of the invention, as hereinabove set forth, can be made without departing from the spirit and scope thereof, and therefore only such limitations should be imposed as are indicated in the appended claims.

I claim:
1. A process for hydrothermally preparing a crystalline silica polymorph which comprises: (1) subjecting an aqueous reaction mixture to high shear mixing for 4 to 100 hours at a temperature of from 250° to 380° F., said reaction mixture containing from 2 to 6 weight percent of sodium oxide, from 8 to 16 weight percent of silicon oxide, from 0.01 to 0.25 weight percent of disodium 4-dodecylated oxydibenzene sulfonate, from 2 to 5 weight percent of anhydrous sulfuric acid, from 0.5 to 3 weight percent of sodium chloride and either from 6 to 13 weight percent of tetrapropyl ammonium bromide or a mixture which comprises from 2 to 4 weight percent of tripropylamine, from 1 to 3 weight percent of 1-bromopropane and from 3 to 6 weight percent of methylethyl ketone, and (2) crystallizing said silica polymorph during said high shear mixing, wherein said crystalline silica polymorph after calcination at 1,000° F. for 16 hours, has as the four strongest d-values of its X-ray diffraction pattern, d=11.05, d=9.96, d=3.82 and d=3.34.

2. The process according to claim 1 wherein the silica polymorph is prepared under a pressure of from 15 to 300 p.s.i.g.

3. The process according to claim 1 wherein the high shear mixing comprises agitation equivalent to a mixing blade peripheral speed of from 360 to 900 ft/minute and a mixture velocity gradient of from 7,000 to 18,000 ft/minute/ft.

4. A process for hydrothermally preparing a crystalline silica polymorph which comprises: (1) forming an aqueous reaction mixture by admixing from 3 to 5 weight percent of sodium oxide, from 10 to 13 weight percent of silicon oxide, from 0.02 to 0.20 weight percent of disodium 4-dodecylated oxydibenzene sulfonate, from 3 to 4 weight percent of anhydrous sulfuric acid, from 1 to 3 weight percent of sodium chloride, and either from 7 to 11 weight percent of tetrapropyl ammonium bromide or a mixture comprising from 2 to 3 weight percent of tripropylamine, from 2 to 3 weight percent of 1-bromopropane and from 3 to 5 weight percent of methyl ethyl ketone, (2) subjecting said reaction mixture to high shear mixing for 4 to 100 hours at a temperature of from 250° to 340° F., and (3) crystallizing said silica polymorph during said high shear mixing, wherein said crystalline silica polymorph after calcination at 1,000° F. for 16 hours, has as the four strongest d-values of its X-ray diffraction pattern, d=11.05, d=9.96, d=3.82 and d=3.34.

5. The process according to claim 4 wherein the silica polymorph is prepared under a pressure of from 15 to 200 p.s.i.g.

6. The process according to claim 4 wherein the high shear mixing comprises agitation equivalent to a mixing blade peripheral speed of from 360 to 700 ft/minute and a mixture velocity gradient of from 7,000 to 14,000 ft/minute/ft.

7. A process for hydrothermally preparing a crystalline silica polymorph which comprises: (1) forming an aqueous reaction mixture by admixing from 3 to 5 weight percent of sodium oxide, from 10 to 13 weight percent of silicon oxide, from 0.02 to 0.20 weight percent of disodium 4-dodecylated oxydibenzene sulfonate, from 3 to 4 weight percent of anhydrous sulfuric acid, from 1 to 3 weight percent of sodium chloride, and either from 7 to 11 weight percent of tetrapropyl ammonium bromide or a mixture comprising from 2 to 3 weight percent of tripropylamine, from 2 to 3 weight percent of 1-bromopropane and from 3 to 5 weight percent of methyl ethyl ketone, (2) subjecting said reaction mixture to high shear mixing which comprises agitation equivalent to a mixing blade peripheral speed of from 360 to 700 ft/minute and a mixture velocity gradient of from 7,000 to 14,000 ft/minute/ft, at a temperature of from 250° to 340° F. and a pressure of from 15 to 200 p.s.i.g., for 4 to 100 hours, and (3) crystallizing said silica polymorph during said high shear mixing, wherein said crystalline silica polymorph after calcination at 1,000° F. for 16 hours, has as the four strongest d-values of its X-ray diffraction pattern, d=11.05, d=9.96, d=3.82 and d=3.34.

* * * * *

UNITED STATES PATENT AND TRADEMARK OFFICE
CERTIFICATE OF CORRECTION

PATENT NO. : 4,344,927
DATED : August 17, 1982
INVENTOR(S) : Dean A. Young

It is certified that error appears in the above-identified patent and that said Letters Patent is hereby corrected as shown below:

On The Title Page insert,

-- [73] Assignee: Union Oil Company of California, Brea, California --.

After the name of the Primary Examiner insert -- Attorney, Agent, or Firm - Dean Sandford, Cleveland R. Williams --.

Signed and Sealed this

Second Day of August 1983

[SEAL]

Attest:

GERALD J. MOSSINGHOFF

Attesting Officer

Commissioner of Patents and Trademarks